A. MACDONALD AND T. W. WALLACE.
FASTENER FOR MAIL BAGS AND THE LIKE.
APPLICATION FILED MAR. 18, 1921.

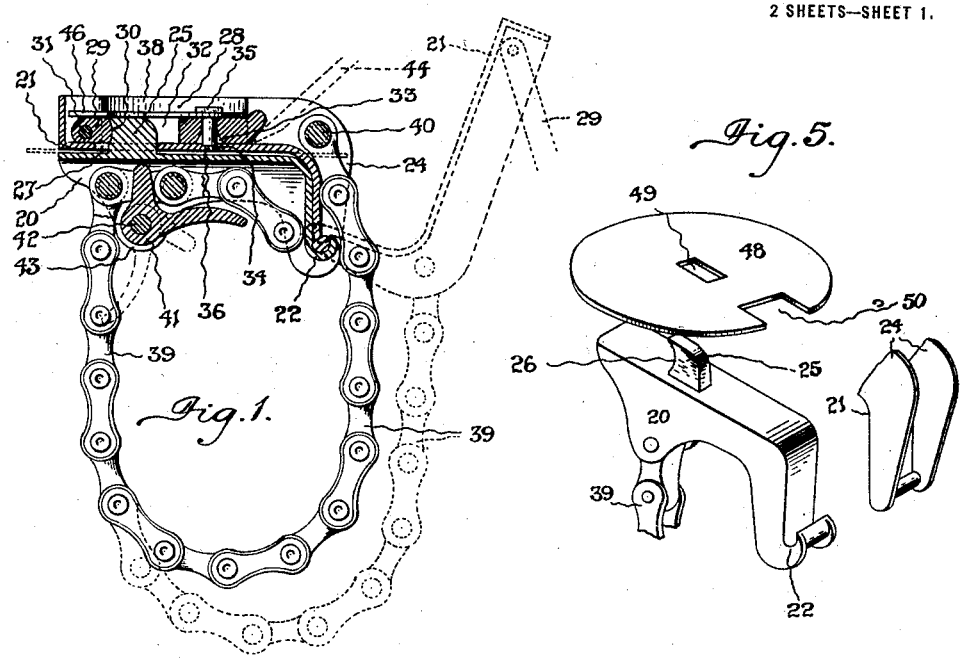

1,388,735.

Patented Aug. 23, 1921.
2 SHEETS—SHEET 2.

Inventors
A. Macdonald
T. W. Wallace
By Marks & Clark
Attys.

UNITED STATES PATENT OFFICE.

ALBERT MACDONALD, OF BURNSIDE, AND THOMAS WILLIAM WALLACE, OF CLARE, SOUTH AUSTRALIA, AUSTRALIA.

FASTENER FOR MAIL-BAGS AND THE LIKE.

1,388,735.

Specification of Letters Patent.   Patented Aug. 23, 1921.

Application filed March 18, 1921.   Serial No. 453,449.

*To all whom it may concern:*

Be it known that we, ALBERT MACDONALD, of 21 West Terrace, Kensington Gardens, Burnside, and THOMAS WILLIAM WALLACE, of Clare, both in the State of South Australia, Commonwealth of Australia, subjects of the King of Great Britain, have invented certain new and useful Improvements in Fasteners for Mail-Bags and the like, for which we have filed application in Australia March 6, 1920, No. 14,612, of which the following is a specification.

This invention relates to improvements in and relating to fasteners for securing the necks of mail bags and the like and refers especially to that type of fastener for mail bags and the like wherein provision is made for sealing the fastener when locked whereby any interference therewith will involve the breakage of the seal and may thereby be readily detected.

The object of this invention is to provide a fastener which can with the utmost despatch be passed around the neck of a mail bag or the like and in which the securing of the parts thereof for the locking of the same imparts a considerable amount of tension to that portion of the fastener passing around the said neck and further in which means are provided for sealing the said locking means and for attaching a reversible label thereto.

We accomplish this object by providing a fastener which consists of a flexible member connected to two interlocking parts one of which is adapted to operate as a lever upon the other part and thereby impart tension to the said flexible member with means for affixing a seal (or sealing wax) over the said interlocking parts.

More particularly the invention consists of a fastener formed in two parts adapted to be interlocked and to pivot on each other and connected by a flexible member whereby when the said flexible member is passed around the neck of a mail bag and the interlocking ends are placed in engagement with each other and the two parts brought together one operates as a lever upon the other and thereby imparts tension to the flexible member around the neck of the bag, the said two parts being securely fastened together by a locking piece which is adapted to be retained in its locked position by wax or a soft metal seal.

The outer part of the fastener is adapted to support a reversible address label which may be locked in position by placing the inner part in engagement with the said outer part or by operating the movable locking piece. The two parts of the fastener are so constructed that the operator in the act of fastening them together exerts a powerful leverage on the flexible member and closes it tightly on the neck of the bag thereby preventing it being slipped off the mouth of the bag and the contents thereof being rifled without breaking the seal.

Alternatively the invention may consist of a rod or rigid piece of metal having one end pivotally secured to the outer part and the opposite end shaped to form the inner part whereby when the said rod or rigid piece of metal is passed through the eyelet holes in the neck of a bag and the inner part is placed in engagement with the outer part they are locked together by operating a locking piece which is located in a cup shaped receptacle formed on the outer part and designed to receive sealing wax which may be impressed by an authenticating seal or the like.

In order that the invention may be readily understood reference will now be had to the accompanying sheets of explanatory drawings, wherein—

Figure 1 is a view in sectional side elevation of a mail bag fastener constructed in accordance with the present invention and adapted to be sealed with a metal plug or with sealing wax.

Fig. 2 is a view in plan of the fastener shown in Fig. 1.

Fig. 3 is a view in perspective of a reversible address label for use with the fastener shown in Figs. 1 and 2.

Fig. 4 is a view in cross section taken on the dotted line 4—4 of Fig. 2.

Fig. 5 is a view in perspective of the inner part and portion of the outer part of the fastener and also a different form of reversible address label for use therewith.

Fig. 6 is a view in plan of a fastener fitted with a locking piece adapted to be sealed with wax.

Fig. 7 is a view in plan of modified form of fastener.

Figure 11:
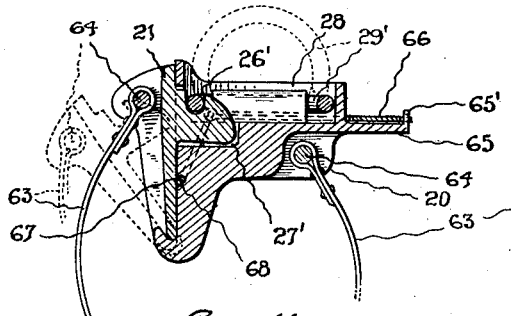
Fig. 11 is a view in sectional elevation of a modified form of fastener fitted with a reversible address label.

In these drawings where like characters of reference have been used to indicate the same or corresponding parts in the different views, the numerals 20 and 21 designate the inner and outer parts respectively of the fastener which are shaped to lie closely to each other.

The inner part 20 is formed with a downwardly curved or right angled extension which terminates in a hook 22 adapted to receive the shaped end of a correspondingly formed extension on the outer part 21.

The end of the extension on the outer part is formed with depending lugs 24 which are adapted to overlap the sides of the hook 22 when the two parts are placed closely together as shown in Fig. 1 and these said lugs prevent lateral movement of the extension on the said outer part.

The loose pivotal connection between the ends of the extensions of the two parts of the fastener permits of the outer part being turned up from the position shown in dotted lines to a closed position as shown in full lines in Fig. 1.

The upper face of the inner part is provided with a stud 25 having a recess 26 in one side thereof which is adapted to pass freely through a slot 27 formed in the upper part when the said upper part is turned over to its closed position.

The stud 25 projects upwardly into a cup or depression 28 formed in the outer part 21 and within this cup or depression is a pivotally mounted locking piece 29 having a bearing face 30, which is formed concentrically with the pivot pin 31 thereof or given an approved cam formation.

The recess 26 in the stud 25 is shaped to correspond with the bearing face of the locking piece and when the two parts of the fastener have been placed in their closed position the said locking piece can be turned down into the cup or depression so that the bearing face thereof will enter the recess in the stud and thereby securely lock the said parts together.

The bearing face of the locking piece 29 is formed at the end of a hole 32 which permits of the said locking piece being passed freely over the stud 25 when it is being turned down into its locking position.

A hole 33 is formed in the free end of the locking piece 29 in line with a hole 34 into the outer part of the fastener and both of these holes are flared or countersunk from their inner ends. The object of the said holes 33 and 34 is to take a plug or pin 35 of lead or other soft material having a conical head 36 adapted to fit neatly in the hole 34. The plug or pin is inserted upwardly through the hole 34 before the outer part 21 is turned over to the locking position and the flaring of the hole 33 insures the locking piece being passed freely over the end of the said plug or pin. The projecting end of the plug or pin 35 is expanded over the top of the locking piece and impressed with suitable numerals, letters or other device to form a satisfactory authenticating seal.

In lieu of sealing the locking piece with a lead plug or pin it can be sealed by pouring hot sealing wax 37 into the cup or depression as shown in Fig. 4.

The cup or depression 28 is constructed by forming a flange 38 around the side edges of the outer part of the fastener, as shown, and the said flanges can extend the full length of the extension thereof to reinforce the same. The free end of the locking piece is formed with an upturned portion adapted to fill the space between the flanges on the sides of the extension and to prevent the escape or overflow of wax from the cup when the locking piece is sealed with this material.

The inner and outer parts of the fastener are secured to opposite ends of a piece of chain 39 or other flexible connecting member and one end of the said chain is fixedly secured to a pin 40 located at some distance from the pivot point of the outer part and the other end of the said chain is adjustably secured to the inner part by means of a pivoted lever or pawl 41.

The lever or pawl is given a bell crank shape and one end is adapted to engage with a link of the chain or a perforation in another form of flexible connection while the operating end is disposed horizontally with and close to the underside of the inner part of the fastener.

The said lever or pawl is pivoted on a pin 42 carried by jaws 43 depending from the underside of the inner part of the fastener and the chain is adapted to pass between the said jaws above the lever or pawl.

If preferred the end of the flexible member can be secured adjustably to the outer part of the fastener by means of a fastening device as 41 constructed as above described or alternately the ends of the flexible member can be secured adjustably to both parts of the fastener.

In operation the chain 39 or other flexible member is passed around the neck of a bag and the end of the extension on the outer part 21 is placed in engagement with the hook 22 on the inner part as shown in dotted lines in Fig. 1 when the said outer part is turned over into its locking position and secured by the locking piece as hereinbefore described. Prior to closing the outer part on to the inner part of the fastener the plug or pin 35 is inserted correctly in the hole 34.

When the two parts of the fastener are being brought together a considerable strain is applied to the chain which causes it to be pulled tightly around the neck of the bag. The extent to which the loop in the chain is shortened is indicated by the difference in the positions of the parts shown in dotted and full lines in Fig. 1.

When the two parts of the fastener have been connected and locked to each other as above described the end of the plug or pin 35 is expanded with any suitable device and impressed with authenticating markings. In lieu of sealing the locking piece with a soft metal plug or pin as 35 hot sealing wax is poured into the cup or depression to cover the same as hereinbefore described.

The length of the loop in the chain can be adjusted to suit different sizes of bags by disengaging the two parts of the fastener and adjusting the lever or pawl so as to allow the free end of the said chain to be moved through the jaw 43 in the direction required. When the chain has been adjusted the lever or pawl is raised to securely fasten the same in its adjusted position.

When the fastener is secured around the neck of a bag the strain on the chain will retain the lever or pawl in its operative position and the said lever or pawl will not be accessible until the fastener has been unlocked and removed from the bag.

In cases where the fastener is to be used on bags of the same size the means for adjusting the length of the loop in the chain can be dispensed with and the end of the chain can be fixedly secured to the pin 42 in the jaws 43 in the same way as the opposite end of the chain is secured to the outer part of the fastener.

In order to unlock the fastener to remove it from a bag the point of an instrument (such as is shown in dotted lines at 44 in Fig. 1) is inserted beneath the free end of the locking piece and actuated to lever up the same to break the seal when the two parts can be detached and the fastener removed.

The edges of the locking piece 29 are beveled inwardly or undercut as shown clearly in Fig. 4 of the drawings with a view to obviating a seal of wax (marked 37) being raised bodily off the locking piece or from the cup, trimmed and replaced on fresh wax after the bag has been rifled. When the locking piece is constructed as above described and a covering of wax has been applied as shown in Fig. 4 any upward thrust on the free end of the locking piece will cause the thinner part of the wax situated above the locking piece to be broken and the seal effectually destroyed while leaving the remainder firmly adhering to the bottom of the cup.

The design of locking piece shown in Fig. 6 of the drawings is suitable when wax is used to seal the fastener and in this case a hole 45 having its lower part flared or countersunk is formed in the bottom of the cup to insure the said wax obtaining a firm seating therein.

A reversible address label for attaching to the fastener is shown in Figs. 1 and 3 of the drawings and comprises a piece of flat sheet metal 46 which is adapted to fit neatly within the cup or depression above the locking piece when this last mentioned part is in its locked position.

The piece of flat metal 46 is provided with a hole 47 to enable the label to pass over the projecting end of the plug or pin 35 and when the point of the said plug or pin is expanded the label will be retained within the cup. This form of label is used when the locking piece is sealed by a soft metal plug as above described.

In Fig. 5 is shown an address label which can be used when the locking piece is sealed with either a wax or soft metal plug or pin. The label in this case consists of a disk 48 of flat metal or other suitable material having a centrally disposed hole 49 which is large enough to permit of the label being easily passed over the stud 25 on the inner part of the fastener. The hole 49 is shaped to conform to the shape of the stud 25 and a recess 50 is formed in one side thereof to permit of the outer part of the fastener being closed tightly on the inner part after the label has been placed in position. The position of this last mentioned form of label on the fastener is shown by dotted lines in Fig. 1.

The opposite sides of both pieces of metal 46 and 48 are marked by writing, stamping, embossing or otherwise with the names of the places from and to which the bag is to be despatched and the label is adjusted to show clearly to which place the bag is to be forwarded.

In the modified design of fastener shown in Fig. 7 of the drawings the outer part 21 is made narrow and the locking piece 29 is shaped rectangular to fit neatly between upwardly projecting flanges 38 which form a cup to protect the said locking piece from coming into contact with anything likely to injure the lead seal employed to retain the said locking piece in position.

A reversible address label of a suitable shape can be fitted within the cup and retained therein by the expandible plug or pin 35 or a disk shaped label can be secured between the two parts of the fastener as hereinbefore described.

Figure 8:
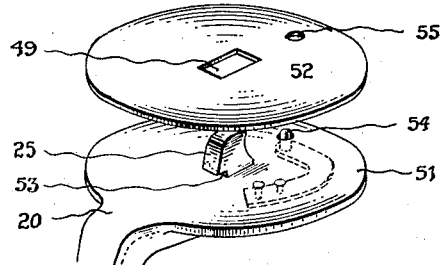
Fig. 8 is a view in perspective of an inner part of a fastener and a reversible address label showing the means employed for securely fastening the label to the said inner part.

In the modification of the invention shown in Fig. 8 of the drawings the inner part 20 of the fastener is provided with a circular flange 51 of the same size or approximately the same size as a circular reversible label 52. The said label is formed with a hole or slot 49 which is adapted to fit over the locking stud 25 and slide forward into a recess 53 therein until a depressible knob or pin 54 protruding through a hole in the flange 51 meets and engages a corresponding hole 55 in the label by which means it is held in position until the fastener is locked on the neck of a bag.

Figure 9:
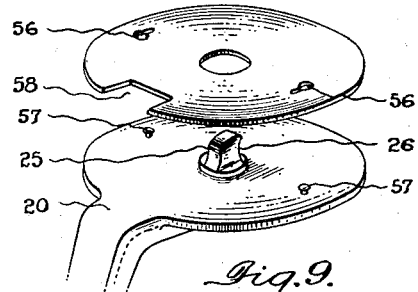
Fig. 9 is a view similar to Fig. 8 showing a modified form of fastening device for the label.

The reversible address label 52 shown in Fig. 9 of the drawings is formed with keyhole slots 56 which are adapted to fit over mushroom shaped studs 57 on the flange 51 and a recess 58 is formed in one side of the said label. The label is passed over the stud 25 and the slots 56 therein are placed in relation to the studs 57 that when the said label is partially rotated it will be locked in place and the recess 58 will be located so as to permit the two parts of the fastener to be locked together.

Figure 10:
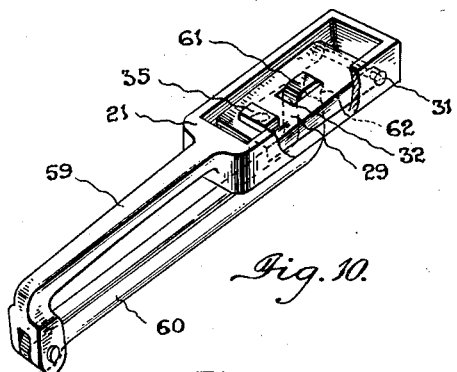
Fig. 10 is a view in perspective of a mail bag fastener adapted for threading through eyelet holes formed in the neck or near the mouth of the bag.

In the design of fastener shown in Fig. 10 of the drawings the outer part 21 is formed with a laterally projecting portion or arm 59 to which is pivotally connected one end of a rigid bar 60 the opposite end of which is shaped to form the inner part of the fastener and is provided with a locking member 61 having a recess 62 for engagement by the locking piece 29 in the outer part. The rigid bar 60 is adapted to be threaded through eyelet holes in the neck of the bag and the locking member 61 thereon is placed in engagement with the locking piece 29 which is retained in its fastened position by means of sealing wax or a lead plug 35 as hereinbefore described.

Figure 12:
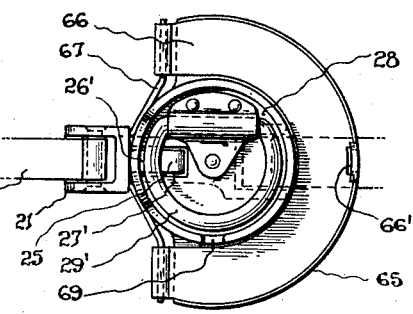
Fig. 12 is a view in plan of the fastener shown in Fig. 11.

In the modified form of fastener shown in Figs. 11 and 12 of the drawings the inner and outer parts thereof are provided with straight extensions and the cup or depression 28 is formed on the inner part 20 and the locking stud 25 is formed on the outer part 21.

The ends of a flexible connecting member 63 (in this instance a flexible strip of steel or like material) are fixedly connected to pins 54 carried by flanges on the two parts of the fastener at some distance from the engaging ends of their extensions.

The top of the said inner part 20 formed with the depression or cup 28 is provided with a flange 65 which extends around approximately three quarters of its circumference.

When the flexible member 63 is passed around the neck of a bag and the shaped end of the outer part 21 is placed in engagement with the hook shaped member the said outer part is then forced upwardly until the stud or projection 25 thereon passes into a recess 27' formed in the inner part. The stud or projection on the outer part is formed with an upwardly opening recess 26' which is adapted to receive a movable member or one side of a locking ring 29' pivoted within the cup shaped depression on the inner part of the fastener.

When the outer part is moving upwardly it exerts a considerable strain on the flexible member and causes it to be pulled tightly around the neck of the bag.

Prior to locking the two parts of the fastener together a reversible address label 66 is attached to the inner part and the said label is locked in position upon the two parts of the fastener being secured to each other.

The said label comprises a flat U-shaped piece of zinc or like sheet metal having its ends folded around the ends of a straight or cranked piece of wire, 67 and the central part of the said label is provided with a recess, 66' which is adapted to engage a projection 65' on the flange 65. A recess 68 is formed in the outer face of the inner part to take the cranked piece of wire 67 and the looped piece of sheet metal having an address on both sides thereof is passed over the cup 28 and fits closely on the surrounding flange 65. The recess 68 in the inner part of the fastener can be provided with a spring catch (not shown) for engaging the cranked piece of wire when the same is passed into the said recess. The cranked shaped piece of wire 67 is securely locked to the fastener by bringing the two parts thereof into position for engagement by the locking ring 29'.

When the two parts of the fastener have been connected to each other as above described hot sealing wax is dropped into the cup shaped depression thereby sealing down the locking ring and the wax can be impressed by a suitable authenticating seal or the like in the ordinary way.

The side of the cup shaped depression is formed with a recess 69 which permits of the introduction of a knife point or the like to raise the locking ring and break the seal conveniently when opening the bag.

Figure 13:
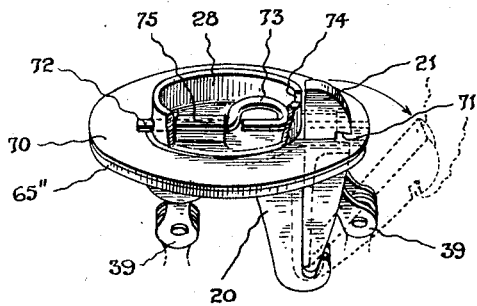
Fig. 13 is a view in perspective of a modified form of mail bag fastener part being shown broken away to clearly show details of construction.

In a modification of that form the invention shown in Figs. 11 and 12 the two parts of the fastener can be locked together by means of a flat ring 70 which is adapted to form a reversible address label (see Fig. 13). In this instance the outer part 21 is formed without the stud or fastening projection 25 and the outer face of the said outer part is formed with a transverse recess 71 into which may be inserted one side of the flat ring 70 prior to dropping the same over the cup shaped member and on to a flange 65 surrounding the same.

The flat ring 70 is fastened by means of a pin 72 which is pivotally mounted within the cup shaped member on the inner part and adapted to slide endwise therein to cause one end to project outwardly above the ring at a point opposite to the outer part.

The fastening pin 72 is formed with a looped portion 73 on one side which is adapted to prevent any end movement thereof when the said looped portion is placed horizontally within and turned down in the cup shaped member.

The side of the cup shaped member opposite that point through which the fastening pin 72 passes to secure the reversible ring 70 is formed with a recess 74 which permits of the said fastening pin being released when the looped portion 73 thereof is raised to a vertical position. The said fastening pin is slidably and pivotally supported by a retaining member 75 secured to or formed on the center of the cup shaped member.

The two parts of the fastener shown in Fig. 13 are connected by a chain or other flexible member and the end of the member which is connected to the inner part of either or both of the fasteners shown in Figs. 11 and 13 can be provided with a length adjusting device such as the lever or pawl 41 hereinbefore described.

We claim—

1. A fastener for mail bags and the like comprising a flexible member having its ends connected to two detachable and interlocking parts adapted to be pivotally connected together so that one part operates as a lever upon the other part and thereby imparts tension to the flexible member and draws the same tightly around the neck of the said bag and may be then locked and sealed.

2. A fastener for mail bags and the like comprising two detachable and interlocking parts having one of their ends adapted to engage with and pivot on each other and provided with locking means on their opposite ends, a chain or like flexible member having its ends connected to the two parts at a distance from their pivot ends, whereby the said parts can be pivotally connected so that one part operates as a lever upon the other part and thereby imparts tension to the flexible member and draws the same tightly around the neck of the said bag and may then be locked and sealed.

3. A fastener for mail bags and the like comprising a flexible member having its ends secured to two detachably connected interlocking parts, a locking piece on one part adapted to be moved into engagement with the second part when the said parts are brought together, and means for affixing a seal to or over the locking piece.

4. A fastener for mail bags and the like comprising two detachable interlocking parts having extensions adapted to be placed in engagement with and pivot on each other, a locking stud on one part adapted to pass through a hole in the second part, a locking piece pivotally mounted on the second part adapted to be placed in engagement with a recess in the locking stud, means for affixing a seal to the locking piece, and a flexible member having its ends connected to the two interlocking parts.

5. A fastener for mail bags and the like comprising two detachable interlocking parts, a flexible member having one end connected fixedly to one part and its opposite end adjustably connected to the other part, a locking device for securely fastening the two parts together when closed, and means for affixing a seal to the locking device.

6. A fastener for mail bags and the like comprising two detachable interlocking parts, extensions on the said parts adapted to engage with and pivot on each other, a flexible member having its ends connected to the two parts at a distance from the engaging ends of the extensions, a locking stud on one part adapted to pass through a hole in the bottom of a cup or depression in the other part, and a locking piece pivotally mounted in the cup or depression adapted to engage with a recess in the locking stud.

7. In a fastener for mail bags and the like as claimed in claim 6 a hole in the bottom of the cup or depression, a hole in the locking piece in line with the hole in the cup or depression, and a soft metal plug adapted to be passed through the said holes and expanded above the locking piece to seal the same.

8. In a fastener for mail bags and the like as claimed in claim 6, a jaw depending from the inner part of the fastener, a pawl or lever pivoted in the jaw and having one end adapted to detachably engage with a link or hole in the flexible member threaded through the said jaw whereby the length of the said flexible member can be adjusted to suit bags of different sizes.

9. In a fastener for mail bags and the like as claimed in claim 6 a reversible address label comprising a flat piece of metal adapted to be inserted in the cup or depression and a hole in the said label to take the point of the soft metal seal, substantially as described.

10. In a fastener for mail bags and the like as claimed in claim 6 a pivoted locking member having a hole therein to receive the locking stud on the inner part and its side edges under-cut substantially as described.

11. A fastener for mail bags and the like comprising two detachable interlocking parts, extensions on the said parts, a hook on the extension of one part and a shaped end on the extension of the second part, lugs projecting from the sides of the shaped end of the extension on the second part adapted to prevent lateral displacement of the said parts when connected to each other, a flexible member having its ends connected to the said parts, and means for locking the two parts securely together.

12. A fastener for mail bags and the like comprising two detachable interlocking parts having extensions thereon adapted to engage with and pivot on each other, a locking stud on the free end of one part adapted to pass through a hole in a cup or depression on the other part, a recess in the upper face of the locking stud, a locking piece or ring pivotally mounted in the cup or depression and adapted to be turned down to fit into the said recess, and a flexible member having its ends connected to the said detachable interlocking parts.

13. In a fastener for mail bags and the like as claimed in claim 12 a flange partially surrounding the cup or depression, and means for securely retaining a reversible address label on the said flange.

14. A fastener for mail bags and the like comprising two pivotally connected interlocking parts, an arm projecting from one part having a pivotal connection with a bar, a locking member on the free end of the bar, a hole in the bottom of a cup or depression on the first mentioned part of the fastener adapted to receive the locking member on the bar, a recess in the locking member, a locking piece pivotally mounted in the cup or depression and having a bearing face adapted to be placed in engagement with the recess in the locking member, and means for affixing a seal to retain the locking piece in its locked position.

In testimony whereof we have affixed our signatures in the presence of two witnesses.

ALBERT MACDONALD.
THOMAS WILLIAM WALLACE.

Witnesses:
  BENJ. BENNY,
  F. ADAMS.